S. JOLLY.
Seed-Planter.
No. 40,565.
Patented Nov. 10, 1863.
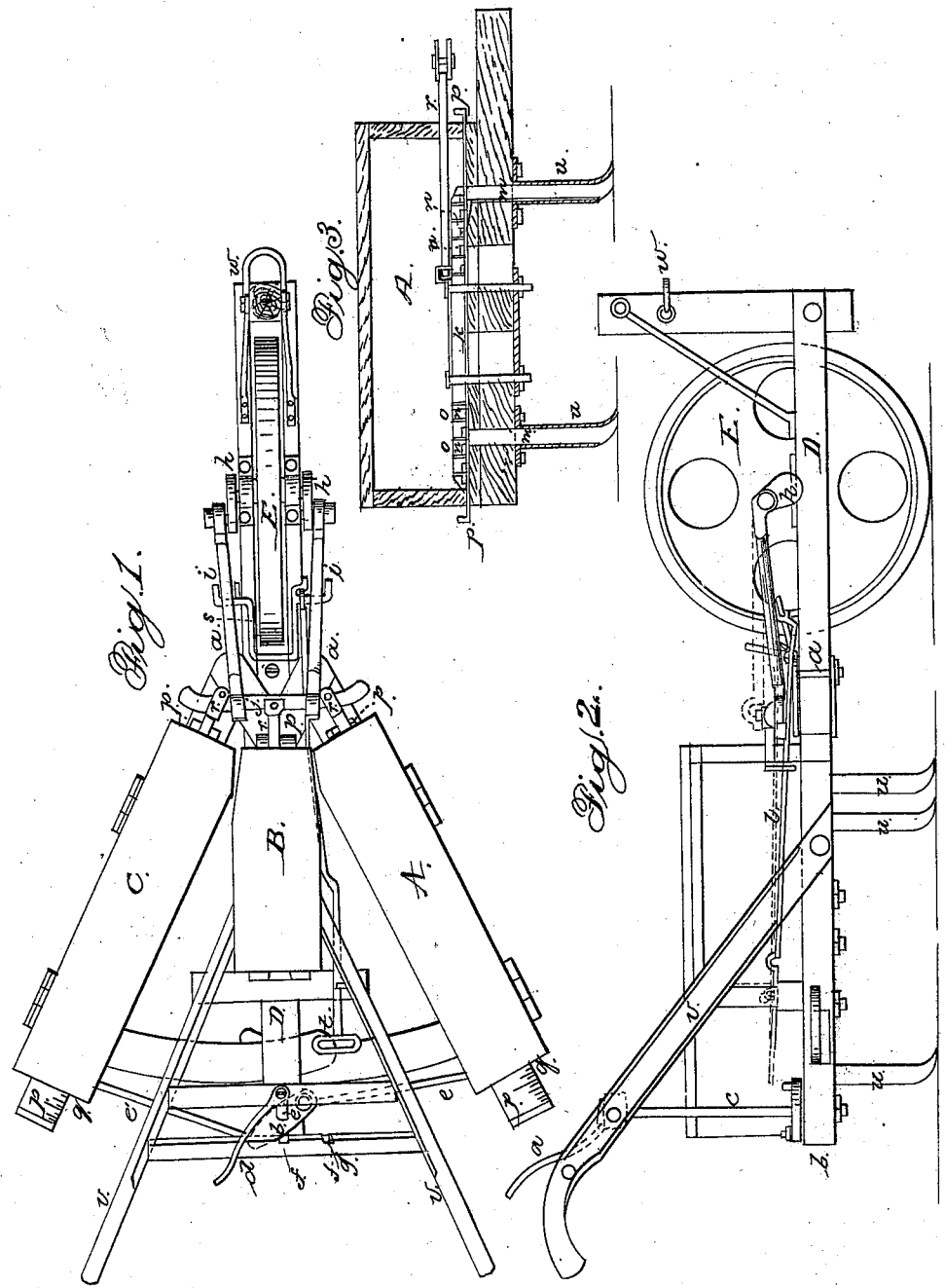
WITNESSES:
W. H. Clark
D. L. Reid
INVENTOR:
W. Clough atty.

UNITED STATES PATENT OFFICE.

SAMUEL JOLLY, OF RIPLEY, OHIO.

IMPROVEMENT IN GRAIN-DRILLS.

Specification forming part of Letters Patent No. 40,565, dated November 10, 1863.

*To all whom it may concern:*

Be it known that I, SAMUEL JOLLY, of Ripley, in the county of Brown and State of Ohio, have invented a new and useful Improvement in Seeding-Machines; and I do hereby declare the following to be a full, clear, and exact description thereof, reference being had to the accompanying drawings and letters of reference marked thereon, forming part of this specification.

My invention relates to that class of machines designed to be used in planting wheat or other grain between rows of standing corn. They are usually expansible, so as to be adjustable to spaces between rows of greater or less distance apart.

My improvements consist in the device for operating the feeding-slides; also in the use of graduating-slides for regulating the discharge of seed; also in the device for disengaging the feed-slides and temporarily suspending the discharge of seed while the machine is in motion.

I will now proceed to describe the machine in detail.

In the annexed drawings, Figure 1 is a plan view of the complete machine. Fig. 2 is a sectional elevation, the part lettered A, Fig. 1, being removed. Fig. 3 is a sectional elevation of one of the feed-boxes, showing the feed-slides, graduated slides, and the apertures through which seed is fed to the ground.

Like letters indicate like parts in the different drawings.

A B C are three seed-boxes, the center box, C, being carried by the central beam, D, in the line of draft, and the other two being pivoted to the main beam at $a\ a$, and expanding laterally therefrom in opposite directions like two parts of a triangular harrow. These two parts are adjustable to any convenient angle, giving greater or less width to the track of the machine and enabling it to be adapted to the space between the rows which are being seeded. This is accomplished by a double crank, $b$, shaft $c$, and handle $d$. The two parts of the double crank are connected by rods $e\ e'$ with the base or supporting-beam of the seed-boxes A C, respectively. By rotating the handle $d$ in an appropriate direction the after ends of A and C may be expanded or contracted, as will appear; and when properly adjusted the handle $d$ may be dropped into one of the notches $f$ in the cross-bar $g$ and the parts will be held in place.

E is a traction-wheel. $h\ h$ are cranks carried by the same.

$i\ i$ are pitmen, constructed and operating like a cam-rod.

$j$ is a cross-bar, with which the pitmen $i\ i$ are connected.

Resting on the bottom of each of the seed-boxes, as represented in Fig. 3, is a feed-slide, $k$, which covers the apertures $m\ m$, through which seed is fed to the ground. On the under side of these feed-slides are oblique transverse channels or grooves $n\ n$, and in the vertical sides of the feed-slides grooves or notches $o\ o$ are formed. These serve to convey small quantities of seed back and forth over the apertures $m\ m$, and cause the prescribed quantity to escape to the ground, as will more fully appear hereinafter. $p\ p$ are thin metal slides, graduated as at $q\ q$, Fig. 1. These slides are adapted to the apertures, and may be adjusted to contract or expand them at pleasure. The graduations $q$ on the slide are made relatively to the number of pecks of grain to an acre of ground, so that by setting the slides appropriately any desired number of pecks may be sown upon each acre.

$r\ r$, &c., are connecting-rods attached to the feed-slides $k$, and, extending through openings in the forward end of the seed-boxes, are attached to cross-bar $j$.

$s$ is a metal U-shaped piece hinged at its base to central beam, D, and with lateral projections acting against under side of pitmen $i\ i$.

$t$ is a rod extending back to the after part of the machine and terminating in a handle, by which the operator is enabled to rotate $s$, with which its forward end is connected, as represented, and by this means elevate the pitmen $i\ i$ and disengage them from cross-piece $j$, and thus for the time being suspend the action of the feed-slides and the discharge of seed from the boxes. The rod $t$ may be operated by a lever connected appropriately, and extending up to a more convenient position for the operator, if desired.

$u\ u$, &c., are hollow teeth, made in the usual manner, through the center of which seed falls to the ground and is covered with earth.

$v\ v$ are handles by which the operator guides and controls the machine, and $w$ is a clevis to which the team is attached.

Having fully described my invention, what I claim as new, and desire to secure by Letters Patent, is the following:

1. The combination and arrangement of the slides $k$, cross-bar $j$, pitmen $i\ i$, and cranks $h\ h$, as and for the purpose specified.

2. In combination with the pitmen $i\ i$, the arrangement of the U-shaped piece $s$ and hand-rod $t$, for disengaging the pitmen from the cross-bar $j$ and temporarily suspending the delivery of seed, as herein described.

SAMUEL JOLLY.

Witnesses:
 WM. ARMSTRONG,
 HENRY SIDWELL.